(12) United States Patent
Qiu et al.

(10) Patent No.: US 8,256,266 B2
(45) Date of Patent: Sep. 4, 2012

(54) TESTING STYLUS FOR TESTING KEYBOARD OF PORTABLE ELECTRONIC DEVICE

(75) Inventors: San-Ping Qiu, Shenzhen (CN); Ren-Zhong Wei, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 123 days.

(21) Appl. No.: 12/909,962

(22) Filed: Oct. 22, 2010

(65) Prior Publication Data

US 2012/0048039 A1 Mar. 1, 2012

(30) Foreign Application Priority Data

Aug. 31, 2010 (CN) .......................... 2010 1 0267989

(51) Int. Cl.
*G01M 7/00* (2006.01)
(52) U.S. Cl. ...................................... 73/12.09
(58) Field of Classification Search .................. None
See application file for complete search history.

(56) References Cited

U.S. PATENT DOCUMENTS

| | | | | |
|---|---|---|---|---|
| 4,279,080 A * | 7/1981 | Nakaya | ........................... | 33/561 |
| 4,829,677 A * | 5/1989 | Yuzuru | ........................... | 33/561 |
| 5,040,931 A * | 8/1991 | Spivey et al. | ................ | 408/185 |
| 5,659,969 A * | 8/1997 | Butler et al. | .................... | 33/561 |
| 5,718,040 A * | 2/1998 | Faure et al. | .................... | 29/846 |
| 5,827,983 A * | 10/1998 | Ortoli | ........................ | 73/865.3 |
| 6,314,825 B1 * | 11/2001 | Fan | ............................. | 73/865.3 |
| 2003/0184329 A1 * | 10/2003 | Ahrikencheikh et al. | .... | 324/754 |
| 2004/0140821 A1 * | 7/2004 | Lee | ................................. | 324/754 |
| 2006/0197541 A1 * | 9/2006 | Madlener et al. | ............ | 324/691 |
| 2008/0088331 A1 * | 4/2008 | Yoshida | ....................... | 324/761 |
| 2009/0289648 A1 * | 11/2009 | Lamson et al. | ............... | 324/754 |

* cited by examiner

*Primary Examiner* — Robert R Raevis
(74) *Attorney, Agent, or Firm* — Altis Law Group, Inc.

(57) ABSTRACT

A testing stylus used for testing a keyboard, includes a sleeve, a resisting member and an elastic member, the resisting member be conductive and have an engageable end and an opposite resisting end, the resisting end is used to resist against the keyboard. The resisting member and the elastic member are assembled in the sleeve, the elastic member resists against the engageable end, to allow the resisting end to be exposed to the outside from the sleeve, the resisting end is withdrawn into the sleeve by pressing the sleeve.

15 Claims, 4 Drawing Sheets

TESTING STYLUS FOR TESTING KEYBOARD OF PORTABLE ELECTRONIC DEVICE

BACKGROUND

1. Technical Field

The present disclosure relates to testing styluses for testing the keyboard of portable electronic devices.

2. Description of the Related Art

Portable electronic devices, such as mobile phones and personal digital assistants, employing touch-panels have become more and more popular. Especially, capacitance-type touch panels because of their good sensitivity. During use of capacitance-type touch panels, the touch areas of the touch panel are directly pressed with a finger, so an electronic field can be formed between a finger and the inside of the electronic device, thus, allowing the electronic device to detect the input signal using sensors.

So, after the electronic device has been manufactured, the quality of the touch panel needs to be tested, this is done by pressing the touch areas of the touch panel. Presently, the testing is implemented manually with fingers of the operators, but it is difficult to maintain a consistent pressing force.

Therefore, there is room for improvement within the art.

BRIEF DESCRIPTION OF THE DRAWINGS

Many aspects of the present testing stylus for testing keyboard of a portable electronic device can be better understood with reference to the following drawings. The components in the drawings are not necessarily drawn to scale, the emphasis instead being placed upon clearly illustrating the principles of the present stylus. Moreover, in the drawings, like reference numerals designate corresponding parts throughout the several views.

DETAILED DESCRIPTION

Figure 1:
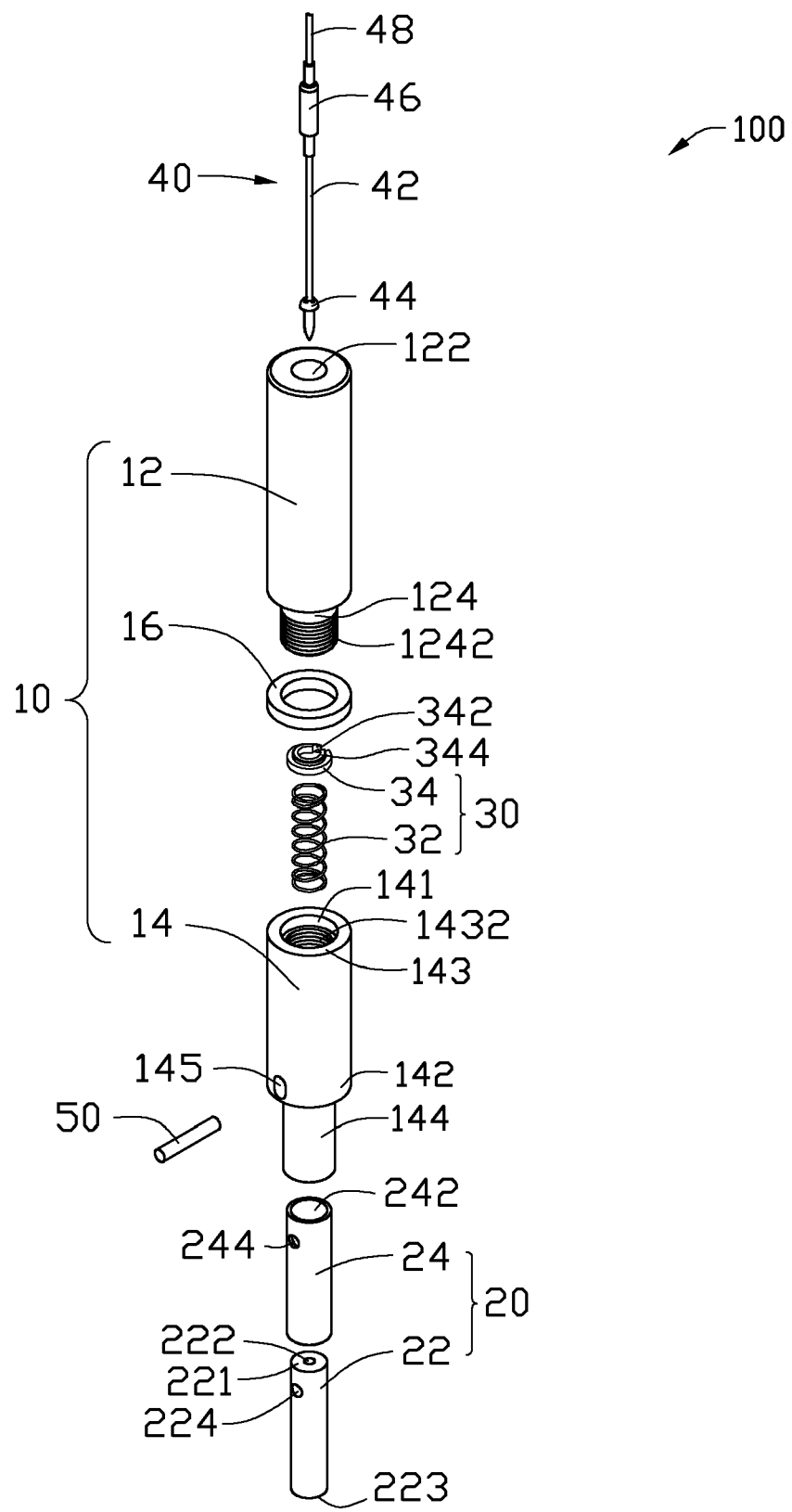
FIG. 1 is an exploded isometric view of a testing stylus for testing the keyboard of a portable electronic device.
Figure 2:
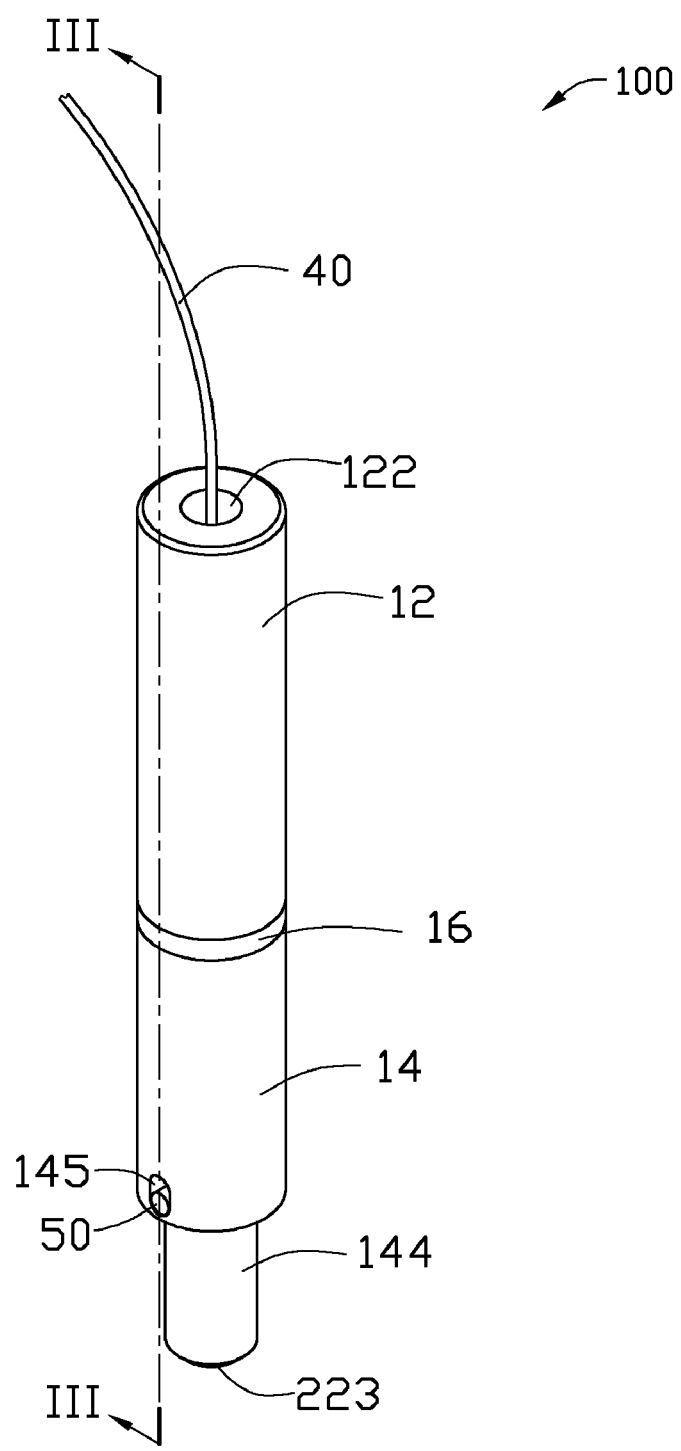
FIG. 2 is an assembled isometric view of the testing stylus shown in FIG. 1.
Figure 3:
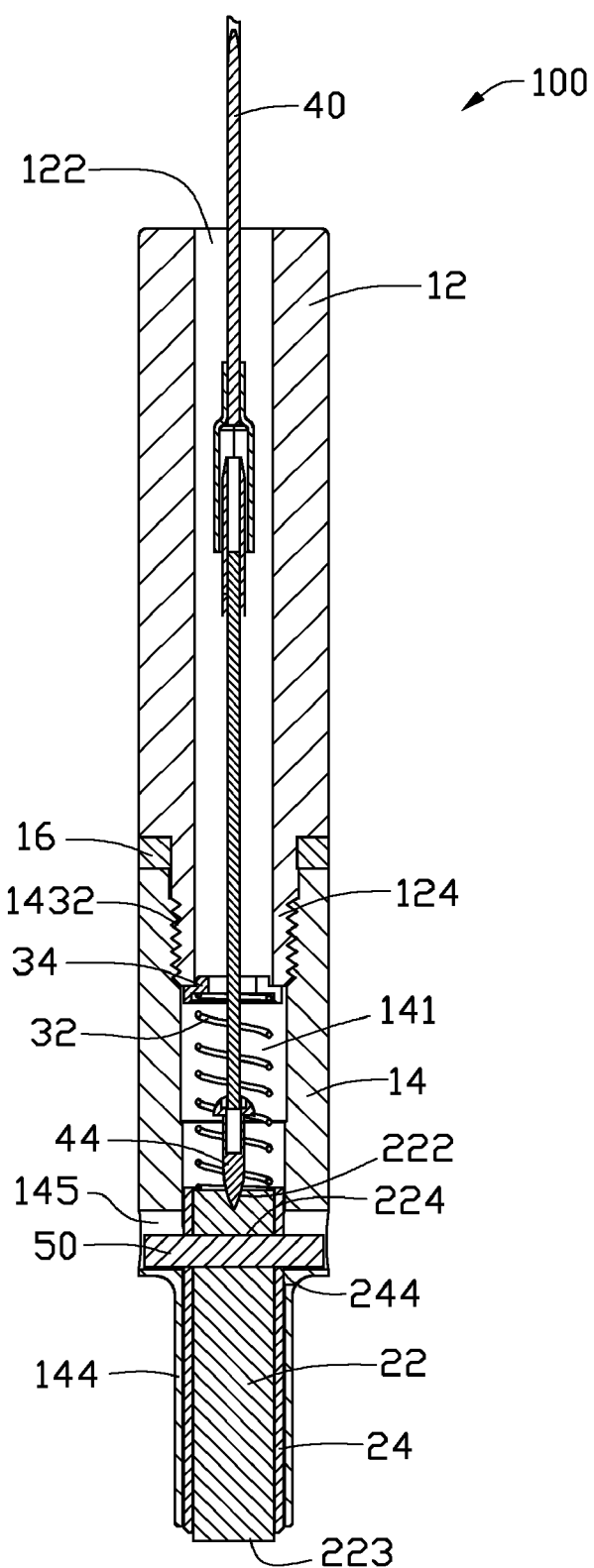
FIG. 3 is a cut-away view of the testing stylus shown in FIG. 2 along the direction III-III.

FIGS. 1 and 3 show an exemplary embodiment of a testing stylus 100 for testing touch areas of a touch panel of a portable electronic device. The testing stylus 100 includes a sleeve 10, a resisting member 20, an elastic member 30, and a conduction wire 40. The resisting member 20 and the elastic member 30 are assembled in the sleeve 10. The elastic member 30 resists against one end of the resisting member 20 to make the opposite end of the resisting member 20 extend out of the sleeve 10. The conduction wire 40 electronically connects to the resisting member 20 and extends through the sleeve 10.

The sleeve 10 includes an upper sleeve 12, a lower sleeve 14 engageable with the upper sleeve 12 and a washer 16 positioned between the upper sleeve 12 and the lower sleeve 14. The upper sleeve 12 axially defines a first through hole 122 at the center passing through the two opposite ends of the upper sleeve 12. The upper sleeve 12 forms a connecting end 124 that connects to the lower sleeve 14. The connecting end 124 has a smaller diameter as the upper sleeve 12, and forms external threads 1242 on the periphery of the external surface. The lower sleeve 14 defines a second axial through hole 141 along the central axis. The lower sleeve 14 includes a main section 142 and an engaging section 144. The engaging section 144 is smaller than the main section 142. The main section 142 has a fixable end 143 that engages with the connecting end 124. The fixable end 143 defines internal threads 1432 on the internal surface. The main section 142 radially defines a guide slot 145 adjacent to the engaging section 144. The guide slot 145 communicates with the second through hole 141 and extends longitudinally along the main section 142. The washer 16 fits around the connecting end 124.

The resisting member 20 includes a resisting rod 22 and a protective tube 24. The resisting rod 22 may be made of an elastic conductive material, such as conductive rubber. The resisting rod 22 has an engageable end 221 and an opposite resisting end 223. The engageable end 221 axially defines a depression 222 to connect to the conduction wire 40. The resisting end 223 resists against selected portions of touch panel being tested. The resisting rod 22 radially defines a first latching hole 224 adjacent to the engageable end 221. The protective tube 24 can be made of metal and is hollow, defining a receiving hole 242 therethrough. The receiving hole 242 can receive the resisting rod 22, and the resisting end 223, which is exposed relative to the protective tube 24. The protective tube 24 radially defines a second latching hole 244 adjacent to an end of the protective tube 24. The second latching hole 244 has substantially the same diameter as the first latching hole 224. The resisting member 20 can be assembled in the second through hole 141 of the lower sleeve 14, and a pin 50 engages with the guide slot 145 and is secured in the first latching hole 224 of the resisting rod 22 and the second latching hole 244 of the protective tube 24.

The elastic member 30 includes a compression spring 32 and a stop ring 34 connecting the end of the compression spring 32. The compression spring 32 can be received in the second through hole 141 of the lower sleeve 14. The stop ring 34 has substantially the same diameter as the connecting end 124. The stop ring 34 defines a gap 342 and forms an annular protrusion 344 for engaging into the first through hole 122.

The conduction wire 40 can electrically connect the resisting rod 22 to an external ground circuit (not shown). The conduction wire 40 includes a main wire 42, a first connector 44 connecting to an end of the main wire 42, a second connector 46 connecting to the other end of the main wire 42, and a ground wire 48 connecting to the second connector 46. The ground wire 48 connects to the ground circuit, enabling the resisting rod 22 to electrically conduct with the ground circuit. Because the ground circuit is at about a zero voltage value, a portion of the touch panel that contacts with the resisting rod 22 will also have about a zero voltage value. When the resisting rod 22 resists against the surface of the touch panel, conduction between the conductive wire 40 and a section of the touch panel contacting the resisting rod 22 is made. Thus, a potential voltage difference between the section of the touch panel contacting the resisting rod 22 and capacitive sensors (not shown) of the touch panel is created and can be measured. Changes in the measured potential voltage difference can be used to test the touch area of a touch panel of a portable electronic device.

Referring to FIG. 3, to assemble the testing stylus 100, the resisting member 20 is assembled into the lower sleeve 14. The resisting member 20 is received in the second through hole 141 of the lower sleeve 14. The resisting rod 22 is received in the receiving hole 242 of the protective tube 24, and the first latching hole 224 is aligned with the second latching hole 244. The pin 50 engages in the guide slot 145 and passes through the first latching hole 224 and the second latching hole 244. The compression spring 32 is assembled in the second through hole 141 and resists against the resisting rod 22. The conduction wire 40 is assembled into the lower sleeve 14, and the first connector 44 engages into the depression 222. After assembly of the stop ring 34, the washer 16 and the upper sleeve 12, the stop ring 34 resists against the connecting end 124, extending the protrusion 344 into the first through hole 122. The washer 16 is coiled around the connecting end 124 and is clamped between the lower sleeve 14 and the upper sleeve 12. The connecting end 124 is connected to the fixable end 143, the external thread 1242 engages with the internal thread 1432. The conduction wire 40 passes through the first through hole 122, exposing the ground wire 48 to the outside. Accordingly, the testing stylus 100 is assembled. When assembled, the compression spring 32 is compressed and the resisting end 223 is exposed relative to the engaging section 144 of the lower sleeve 14.

Figure 4:
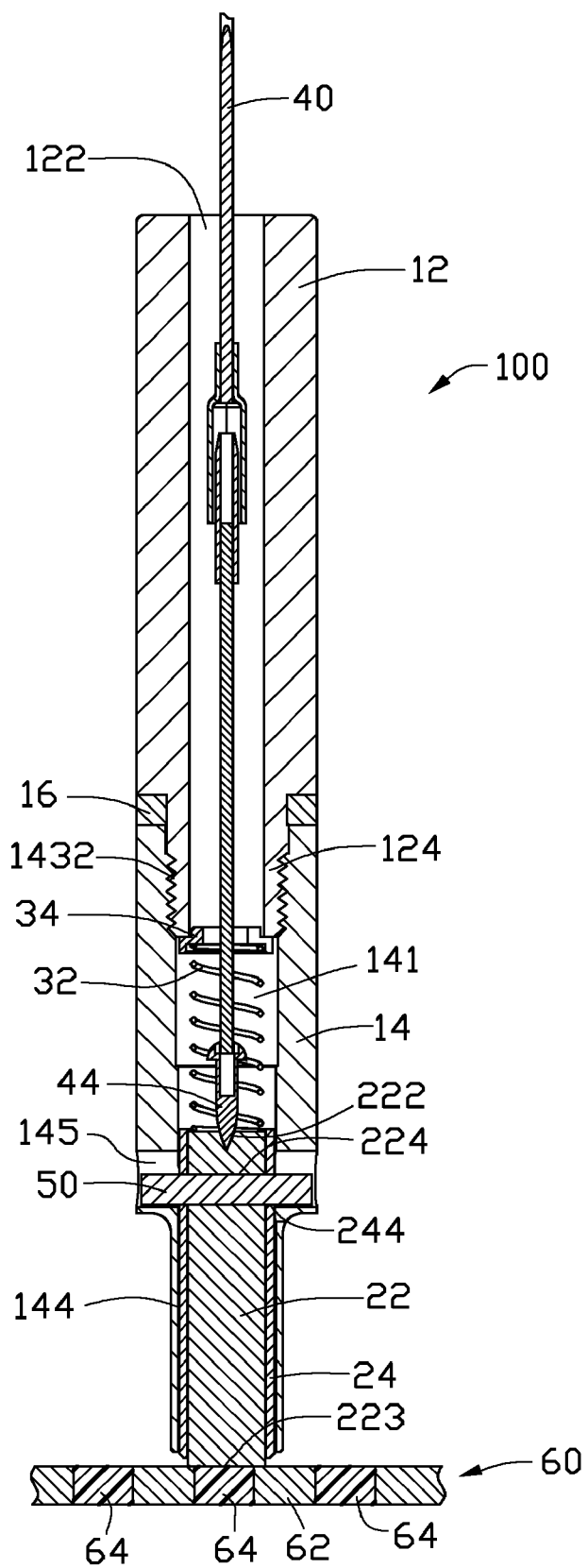
FIG. 4 is a cut-away view of the testing stylus shown in FIG. 3, when the testing stylus is in use.

Referring to FIG. 4, to use the testing stylus 100 for testing a keyboard 60, the keyboard 60 has a touch panel 62 and a number of touch areas 64 arranged on the panel 62. In one example, the touch area 64 can be in the form of virtual keys on the panel 62. Each touch area 64 is smaller than the end surface of the resisting end 223. The resisting end 223 can resist against the touch area 64 for testing the sensitivity of the touch area 64, as described above. The sleeve 10 is pushed toward the keyboard 60 until the engageable section 144 resists against the touch panel 62. The resisting end 223 is completely received in the second through hole 141 and resists against the touch area 64. The compression spring 32 is compressed to maximum. By further pushing the sleeve 10 toward the keyboard 60, because the engageable section 144 resists against the touch panel 62, the resisting end 223 cannot be withdrawn from the second through hole 141. The compressed length of the compression spring 32 is constantly maintained and the pressing force of the resisting end 223 to the touch area 64 is unchanged. Because the compressed length of the resisting end 223 is the same every time, the testing stylus 100 can make sure the pressing force is even every time.

It is to be understood that the conduction wire 40 can be omitted, the sleeve 10 and the pin 50 can be made of conductive material. Thus, a user can grasp the resisting member 20 to be a ground.

It is to be understood that either or all of the washer 16, the protective tube 24 and the stop ring 34 can be omitted.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A testing stylus for testing a keyboard of an electronic device, comprising:
   a sleeve;
   a conductive resisting member having an engageable end and an opposite resisting end, the resisting end being used to resist against a touch area of the keyboard;
   an elastic member; and
   a conduction wire;
   wherein the resisting member and the elastic member are assembled in the sleeve, the elastic member resists against the engageable end, to expose the resisting end to outside of the sleeve, the conduction wire electronically connects to the resisting member and extends to outside of the sleeve, and the resisting end can withdraw into the sleeve by pressing the sleeve;
   wherein the sleeve includes an upper sleeve and a lower sleeve, the upper sleeve has a connecting end, and the lower sleeve has a fixable end to connect to the connecting end;
   wherein the upper sleeve has a first through hole axially passing through the two opposite ends thereof, the lower sleeve has a second through hole axially passing through the two opposite ends thereof, and the first through hole communicates with the second through hole after the upper sleeve is connected to the lower sleeve; and
   wherein the lower sleeve includes a main section, the main section radially defines a guide slot, and the guide slot communicates with the second through hole and extends longitudinally along the main section.

2. The testing stylus for testing a keyboard as claimed in claim 1, wherein the sleeve further includes a washer, and the washer fits around the connecting end.

3. The testing stylus for testing a keyboard as claimed in claim 1, wherein the connecting end has external threads on the periphery of the external surface, and the fixable end has internal threads to engage the external threads.

4. The testing stylus for testing a keyboard as claimed in claim 1, wherein the lower sleeve includes an engaging section connecting to the main section, and the engaging section is smaller than the main section.

5. The testing stylus for testing a keyboard as claimed in claim 1, wherein the resisting member includes a resisting rod, the resisting rod is made of elastic conductive material, and the resisting rod has the engageable end and the opposite resisting end.

6. The testing stylus for testing a keyboard as claimed in claim 5, wherein the engageable end axially defines a depression to connect the conduction wire.

7. The testing stylus for testing a keyboard as claimed in claim 5, wherein the resisting rod radially defines a through first latching hole, the resisting rod is received in the lower sleeve, and a pin a pin passes through the guiding slot of the lower sleeve and latches into the first latching hole of the pressing rod.

8. The testing stylus for testing a keyboard as claimed in claim 7, wherein the elastic member includes a compression spring, and the compression spring is received in the second through hole of the lower sleeve and is compressed between the engageable end of the resisting rod and the connecting end of the upper sleeve.

9. The testing stylus for testing a keyboard as claimed in claim 8, wherein the elastic member further includes a stop ring, and the stop ring connects to an end of the compression spring.

10. The testing stylus for testing a keyboard as claimed in claim 7, wherein the conduction wire includes a main wire, a first connector connecting to an end of the main wire, a second connector connecting to the other end of the main wire, and a ground wire connecting to the second connector, and the first connector connects to the engageable end of the resisting rod.

11. The testing stylus for testing a keyboard as claimed in claim 5, wherein the resisting member further includes a protective tube, the protective tube axially defines a receiving hole, and the receiving hole receives the resisting rod therein, the resisting end is exposed relative to the protective tube.

12. The testing stylus for testing a keyboard as claimed in claim 11, wherein the protective tube radially defines a through second latching hole, the resisting member is received in the lower sleeve, and the pin passes through the guide slot of the lower sleeve and latches into the first latching hole and the second latching hole.

13. A testing stylus for testing a keyboard of an electronic device, comprising:

a sleeve;

a conductive resisting member having an engageable end and an opposite resisting end, the resisting end being used to resist against a touch area of the keyboard; and an elastic member;

wherein the resisting member and the elastic member are assembled in the sleeve, the elastic member resists against the engageable end, to expose the resisting end to outside of the sleeve, and the resisting end withdraws into the sleeve by pressing the sleeve;

wherein the sleeve includes an upper sleeve and a lower sleeve, the upper sleeve has a first through hole axially extending, the lower sleeve has a second through hole axially extending, and the first through hole communicates with the second through hole after the upper sleeve is connected to the lower sleeve; and wherein the lower sleeve defines a guide slot, the resisting member includes a resisting rod, the resisting rod radially defines a through first latching hole, and a pin passes through the guide slot of the lower sleeve and latches into the first latching hole of the resisting rod.

14. The testing stylus for testing a keyboard as claimed in claim 13, wherein the testing stylus includes a conduction wire, the conduction wire is assembled in the sleeve and electronically connects to the resisting member, and an end of the conduction wire extends to outside of the sleeve.

15. The testing stylus for testing a keyboard as claimed in claim 13, wherein the resisting member further includes a protective tube, the protective tube axially defines a receiving hole, the receiving hole receives the resisting rod therein, and the resisting end is exposed relative to the protective tube.

* * * * *